United States Patent
Feldmeyer

(10) Patent No.: US 6,580,607 B1
(45) Date of Patent: Jun. 17, 2003

(54) ELECTRONIC COMPONENT MOUNTING ASSEMBLY AND PORTIONS THEREOF

(75) Inventor: Mark D. Feldmeyer, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/052,161

(22) Filed: Jan. 16, 2002

(51) Int. Cl.[7] .................................................. G06F 1/16
(52) U.S. Cl. ........................................ 361/685; 361/747
(58) Field of Search ................................. 361/685, 801, 361/726, 732, 740, 741, 747, 756, 759, 800, 802; 312/223.1, 223.2; 211/41.17, 26.2

(56) References Cited

U.S. PATENT DOCUMENTS

| | | | | |
|---|---|---|---|---|
| 5,112,119 A | * | 5/1992 | Cooke et al. ................. | 312/283 |
| 5,587,889 A | | 12/1996 | Sacherman ................... | 361/809 |
| 5,806,949 A | | 9/1998 | Johnson ...................... | 312/334.7 |
| 6,275,377 B1 | * | 8/2001 | Liu et al. ...................... | 361/685 |
| 6,330,147 B1 | * | 12/2001 | Adams et al. ............... | 361/679 |
| 6,418,012 B1 | * | 7/2002 | Dials et al. .................. | 361/685 |
| 6,469,889 B1 | * | 10/2002 | Gan ............................ | 361/685 |
| 6,473,300 B1 | * | 10/2002 | Youngquist et al. ......... | 361/685 |

* cited by examiner

Primary Examiner—David Martin
Assistant Examiner—Phuong T. Vu

(57) ABSTRACT

An electronic apparatus and portions thereof are disclosed including an electronic component; a rail member; and an elongated resilient member used to attach the rail member to the electronic component.

29 Claims, 9 Drawing Sheets

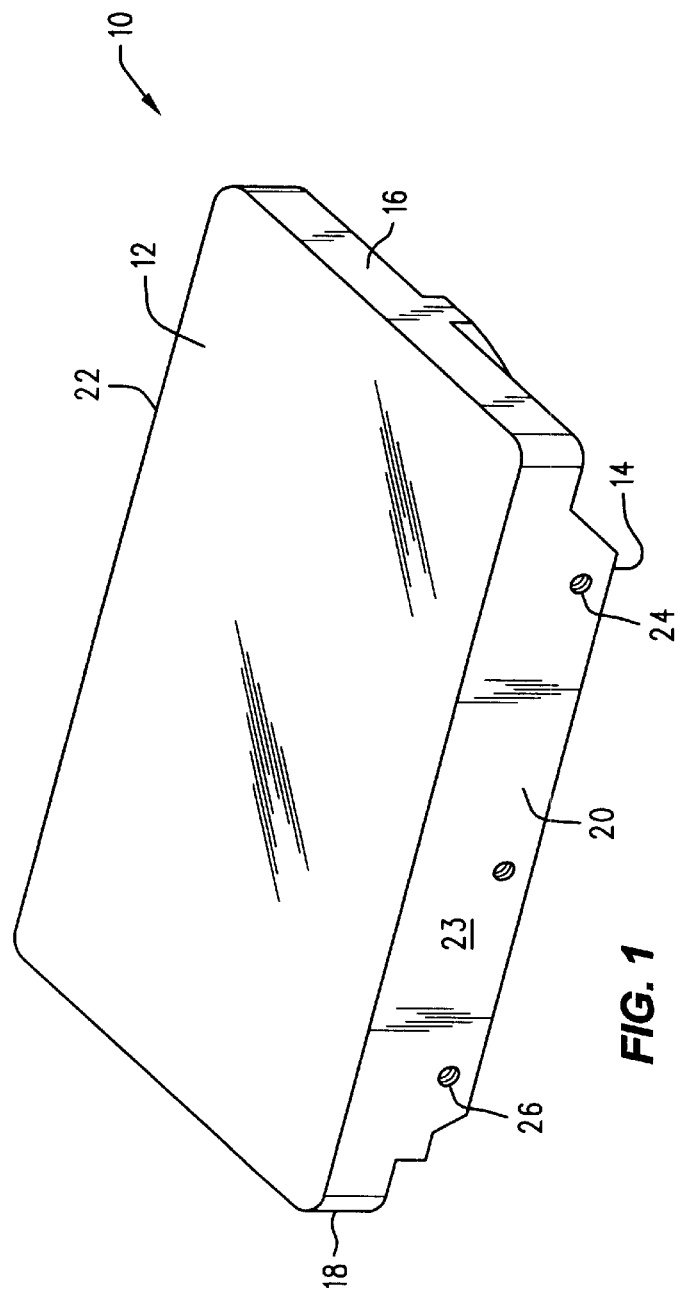
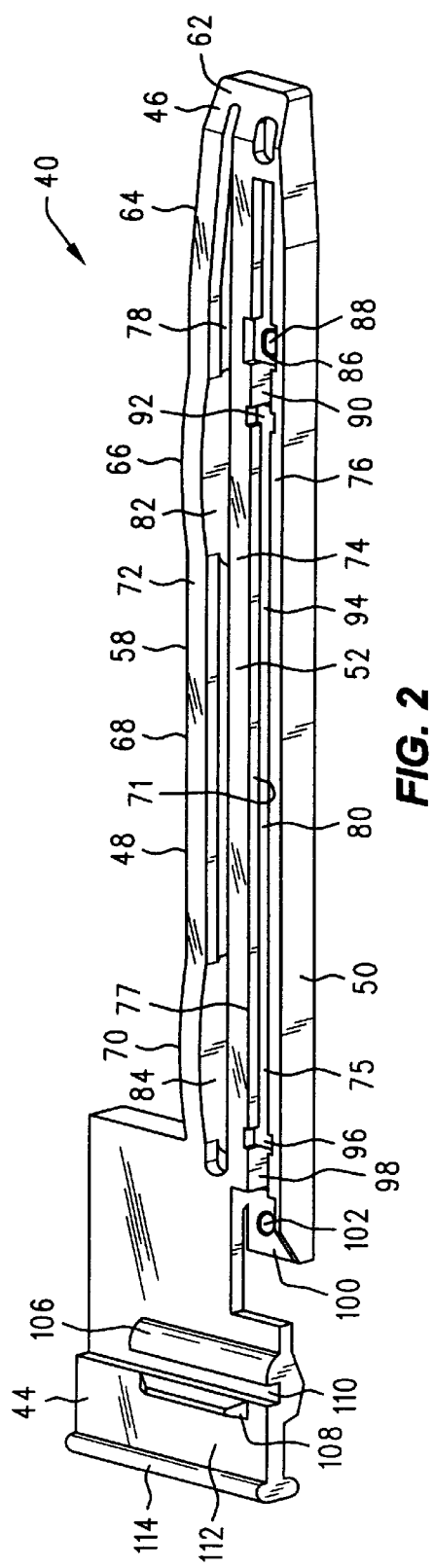

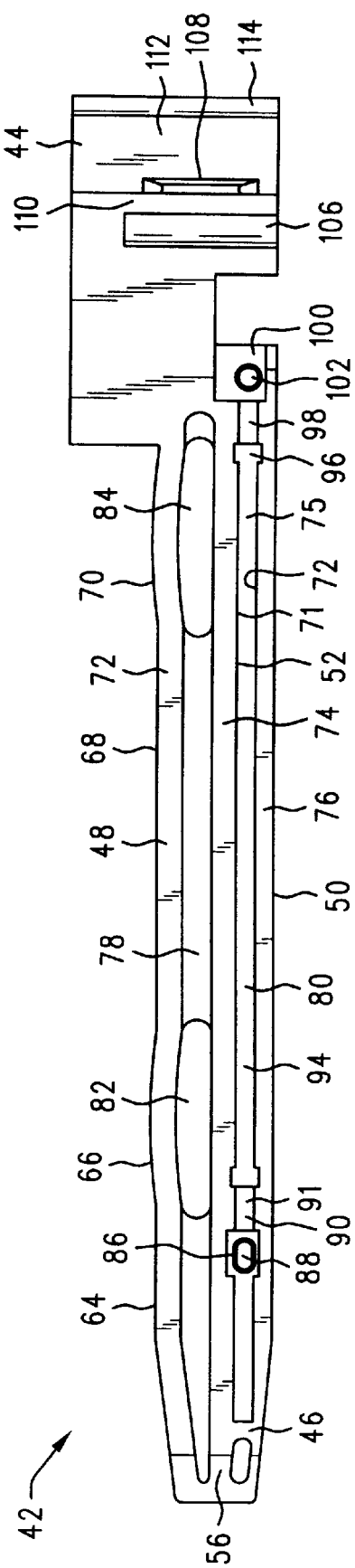
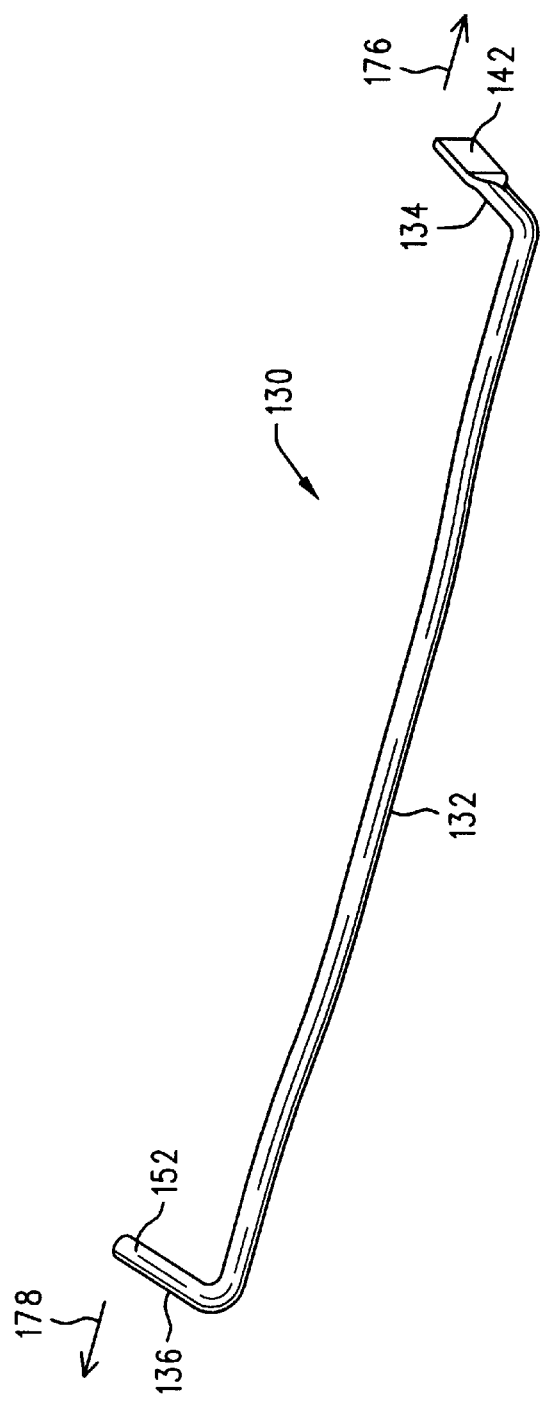
FIG. 3
FIG. 4

ELECTRONIC COMPONENT MOUNTING ASSEMBLY AND PORTIONS THEREOF

BACKGROUND

Many electronic apparatus have modular type components which are mounted in a mounting bracket of the electronic apparatus. An example of such an electronic apparatus is a so called "rack mount" computer system in which various electronic components mounted on pairs of rails are slid into a rack unit which supports and grounds the components and also electrically connects the components to the rest of the computer system. Another example is an automotive electrical system which has exchangeable stereo, compact disk drive, and tape deck units. The units are mounted on rails and slide into and out of a bracket mounted on the car dash board. When fully inserted a unit is electrically connected to the automotive electrical system.

The rails attached to electronic components have traditionally been attached by screws received in threaded bores in the sidewalls of the electronic components. Other means for attaching rails to electronic components are described in U.S. Pat. No. 5,587,889, issued Dec. 24, 1996 of Sacherman and U.S. Pat. No. 5,806,949, issued Sep. 15, 1998 of Johnson, both of which are hereby incorporated by reference for all that is disclose therein.

SUMMARY OF THE INVENTION

In one embodiment the invention comprises an electronic apparatus including: an electronic component; a rail member positioned adjacent the electronic component; an elongated resilient member extending through the rail member and having an intermediate portion and having first and second end portions engaging the electronic component and applying opposite, outwardly directed forces thereto.

In another embodiment the invention comprises a device for attaching a rack mount slide rail to an electronic component having a pair of spaced apart apertures on one side thereof including: a unitary wire member having a first end portion and a second end portion sized to be received in the spaced apart apertures; the wire member having an unstressed operating state wherein the first and second end portions are spaced apart at a distance greater than the distance between the apertures and having an elastically strained operating state wherein the first and second end portions are spaced apart at substantially the same distance as the distance between the apertures.

In another embodiment the invention comprises a guide rail assembly for use in mounting an electronic component to an electronic apparatus including: an elongated resilient guide rail member having first and second apertures therein; a generally U-shaped wire member having an elongated central body portion and outwardly flared arm portions, the arm portions being received in the first and second apertures.

In another embodiment the invention comprises a method of mounting a rack mount slide rail to an electronic component comprising: attaching an elongated resilient member to the slide rail; elastically inwardly displacing opposite end portions of the resilient member; inserting the elastically inwardly displaced end portions of the resilient member into apertures in the electronic component.

In another embodiment the invention comprises a method of mounting an electronic component in an electrical system including: attaching an elongated resilient member to a slide rail; applying a deforming force to elastically inwardly displace opposite end portions of the resilient member; inserting the inwardly displaced end portions of the resilient member into apertures in the electronic component; releasing the deforming force so that the end portions deflect outwardly and engage the side walls of the apertures applying outwardly directed force thereto.

In another embodiment the invention comprises an electronic apparatus including: means for receiving at least one electronic components therein; means for slidingly supporting an electronic component received in the means for receiving; means for tensioningly engaging the electronic component for attaching the component to the means for slidingly supporting the component.

BRIEF DESCRIPTION OF THE DRAWINGS

Embodiments of the invention including the best mode presently contemplated for practicing the invention are illustrated in the attached drawing in which:

FIG. 1 is a perspective view of an electronic component;

FIG. 2 is a perspective view of a rail member;

FIG. 3 is a side view of a rail member;

FIG. 4 is a perspective view of an elongated resilient member;

DETAILED DESCRIPTION

Electronic Component 10

Figure 5:
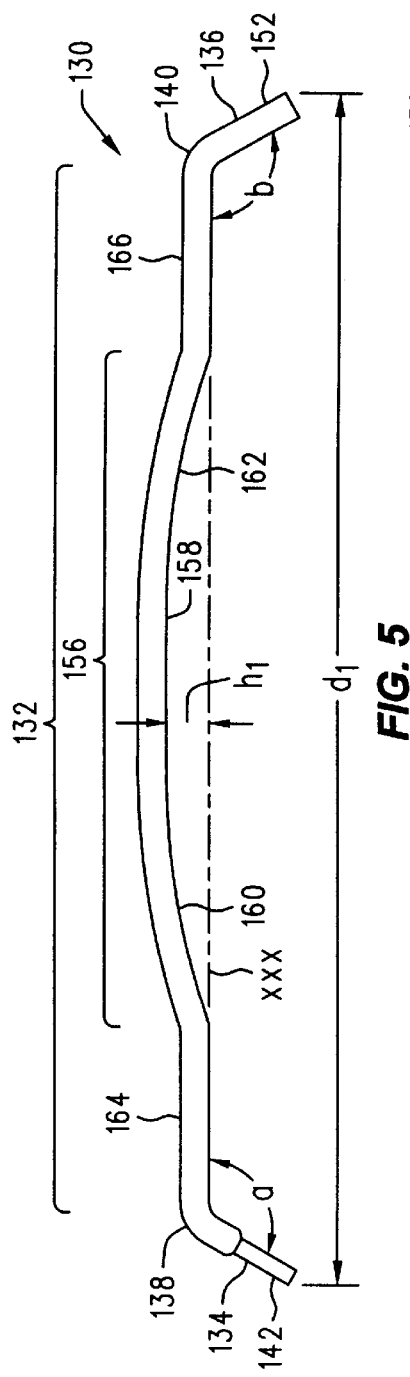
FIG. 5 is a schematic side elevation view of an elongated resilient member in an unstressed state.

FIG. 1 illustrates an electronic component 10 having a top wall 12, bottom wall 14, front wall 16, back wall 18, left wall 20 and right wall 22. The right wall may be a mirror image of the left wall 20. The left wall and right wall each have at least a pair of apertures 24, 26 therein, which may be conventional threaded bores used for screw attachment of rail members or which may be other type of apertures. Each side wall 20, 22 may have an inside surface 21 and an outside surface 23, FIG. 9. The electronic component may have an electrical connector 11 mounted on the back wall 18. It is to be understood that the designations front, back, left, right, top, bottom are arbitrary and are simply used to facilitate description of the illustrated embodiment. The electronic component 10 may be any type of electronic component which is to be rail mounted, for example a computer hard drive, a DVD drive, a radio, a CD player or a tape deck.

Rail Members 40, 42

Figure 12:
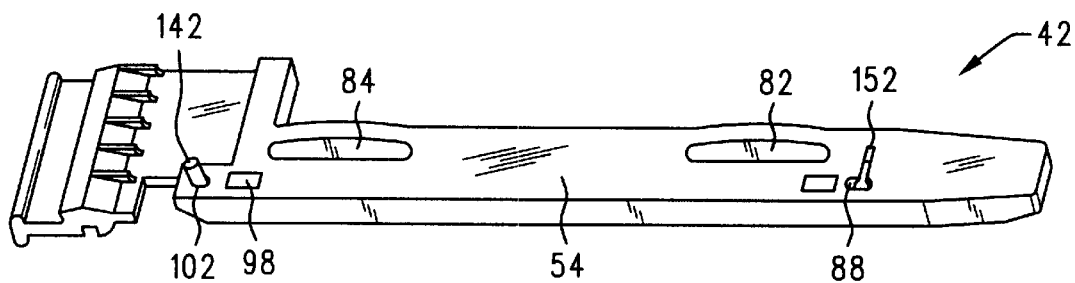
FIG. 12 is another perspective view of a rail member having an elongated resilient member mounted thereon.
Figure 13:
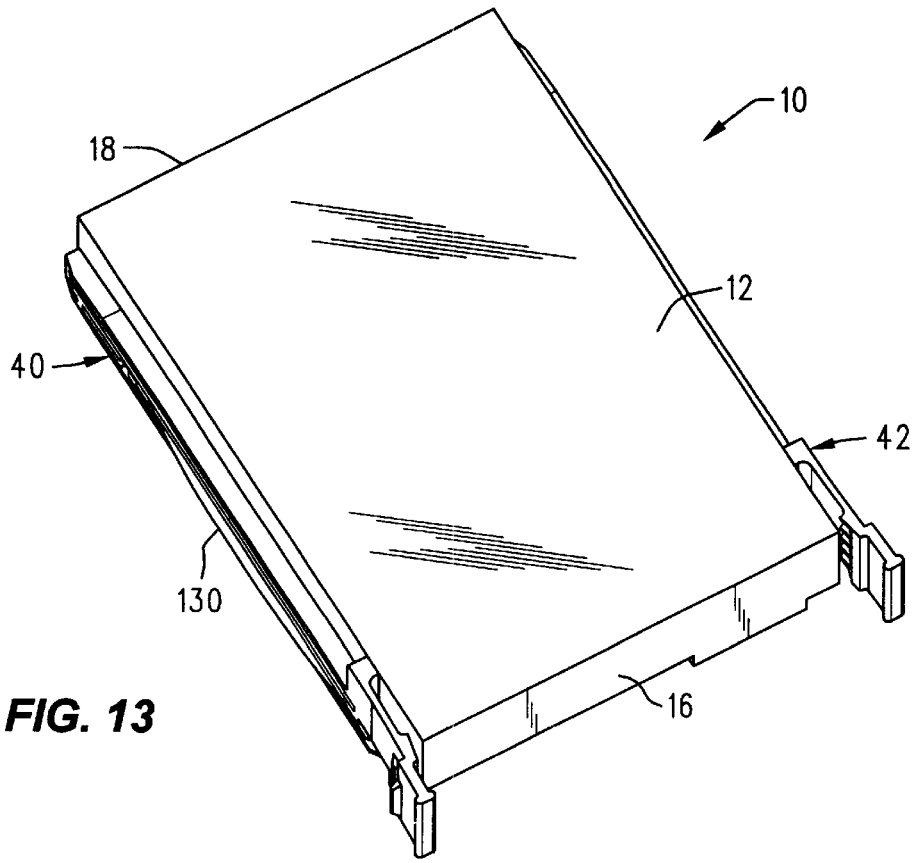
FIG. 13 is a perspective view of an electronic component having rail members mounted thereon by elongated resilient members.
Figure 14:
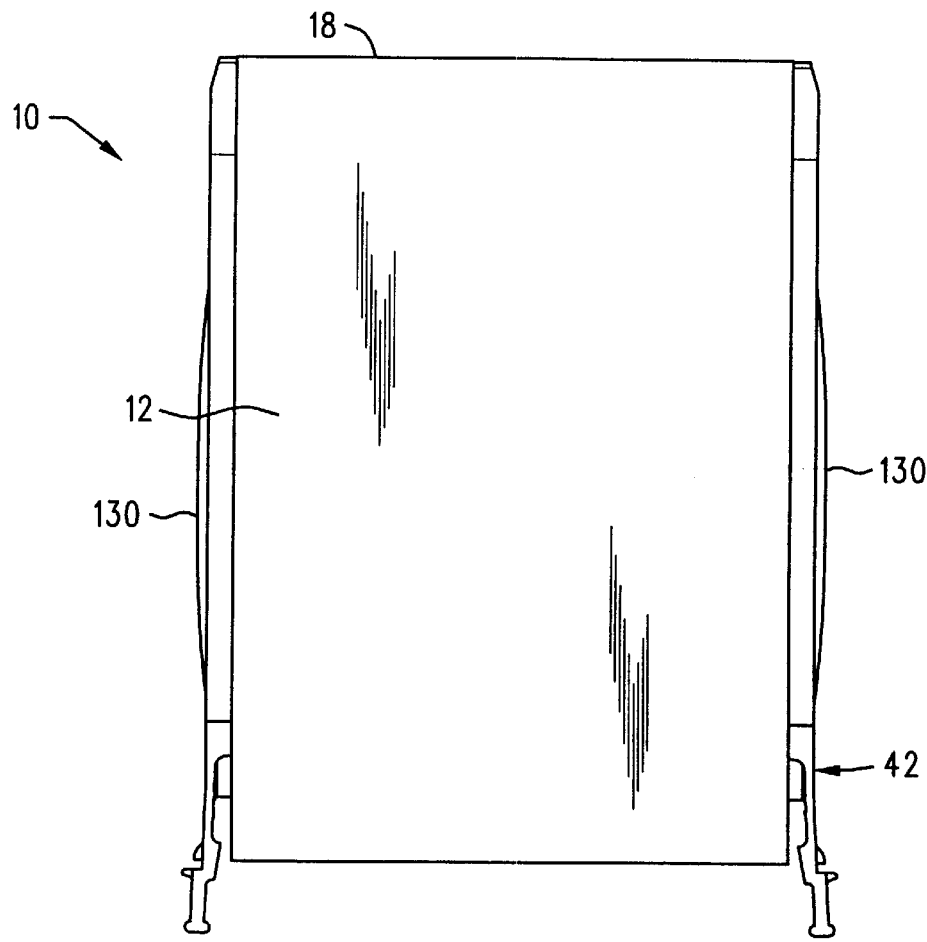
FIG. 14 is a top plan view of the assembly of FIG. 13.
Figure 15:
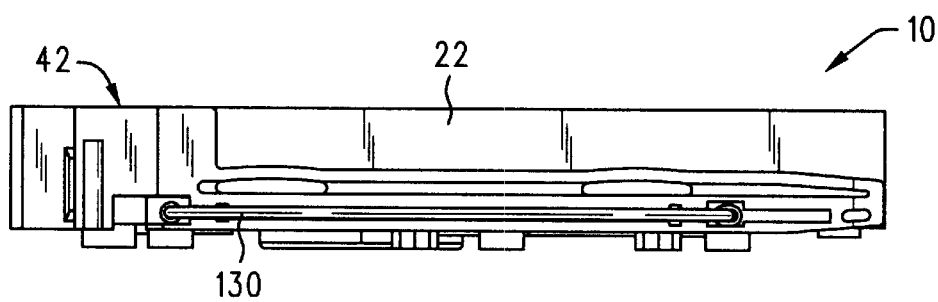
FIG. 15 is a right side elevation view of the assembly of FIG. 13.
Figure 16:
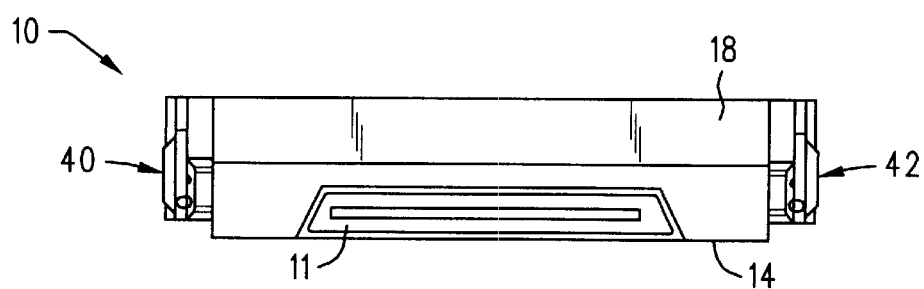
FIG. 16 is a rear elevation view of the assembly of FIG. 13.

FIGS. 2 and 3 illustrate rail members 40, 42 which in this particular embodiment are mirror image rail members. Each rail member has a front end portion 44, rear end portion 46, top portion 48, bottom portion 50, bracket facing side portion 52 and electronic component facing side portion 54, FIG. 12. Each rail member 40, 42 may have an elongated smaller height portion 58 and a shorter length, larger height portion 60 integrally formed with the portion 58. The smaller height portion 58 may include a beveled rear tip 62 having top, bottom and front surfaces which taper rearwardly. The smaller height portion 58 may also include a first flat top region 64 connected to a first upwardly arched region 66 which is in turn connected to a second flat top region 68. Region 68 is connected to a second upwardly arched region 70. The sections of portion 58 which include the arched regions 66, 70 have a slightly greater overall height than the sections which include the flat top regions 64, 68. The smaller height portion 58 includes longitudinally extending rib portions 72, 74, 76 defining channels 78, 80 in side portion 50. Each channel has two sidewalls 71, 73 extending between a base wall 75 and a distal edge 77. Within channel 78 are cut out portions 82, 84 positioned below each of the arched regions 66, 70. Channel 80 includes an enlarged channel width region 86 having a cut out 88 extending there through. In the reduced channel width region 90 the sidewalls 71, 73 are positioned closer together at their distal edges 77 than at their edges connected to base wall 75. Channel 80 includes a reduced channel width region 90 which also includes a cut out 91 extending therethrough. Channel 80 further includes enlarged channel width region 92 and normal channel width region 94. Region 94 terminates at an enlarged channel width region 96 which is in turn connected to a reduced channel width region 98 which is positioned within the larger height portion 60 of the rail member. A cut out 99 extends through the reduced channel width region 98. In region 98, like region 90, the channel side walls 71, 73 are closer together at their open edges than at their edges attached to base 75. Region 98 is connected to a channel opening region 100 which includes a cut out 102 extending therethrough. The larger height portion 60 of each rail member may include a transverse rear rib 106 and a transverse front rib 108 which define a retention slot 110 therebetween. The larger height portion 60 also includes a front tab 112 terminating in a transverse front lip 114. Each rail member 40, 42 may be an integrally formed rail member and may be constructed from a high strength, relatively stiff, resilient material such as high strength plastic, e.g. PC, ABS, or blends of PC and ABS.

Elongated Flexible Member 130

FIG. 4 illustrates an elongated flexible member 130. Schematic drawings of the elongated flexible member 130 are provided in FIGS. 5–7 which show certain curves, angles, lengths, etc., are exaggerated to facilitate description. The elongated flexible member 130, in one embodiment, is a heavy gauge, e.g., 2 mm diameter, steel wire member. However, any relatively stiff, resilient material which is also a good electrical conductor may be used, such as titanium or berylium copper wire. The elongated flexible member 130 may be a generally U-shaped member having a central body portion 132 with first and second arm portions 134, 136 connected thereto by shoulder portions 138, 140. The shoulder portions connect the arm portions to the central body portion at angles "a" and "b" which are preferably obtuse angles i.e. greater than 90 degrees. In the illustrated embodiment the first arm portion 134 has a flattened end portion 142 having a generally rectangular outer face 144 having parallel edge portions 146, 148, FIG. 8. The second arm portion 136 may terminate in a cylindrical end portion 152 having the same diameter as the rest of the wire member. Although a cylindrical end portion and a flat end portion are shown in the illustrated embodiment it is to be understood that many other shapes, such as threaded or roughened surface shapes, etc., may be used for either or both end portions. The central body portion 132 includes a bowed portion 156. The bowed portion may include a straight center portion 158 having arcuate portions 160, 162 integrally attached at either end thereof. The bowed portion 156 may be attached to straight portions 164, 166 which are in turn connected to shoulder portions 138, 140.

Figure 6:
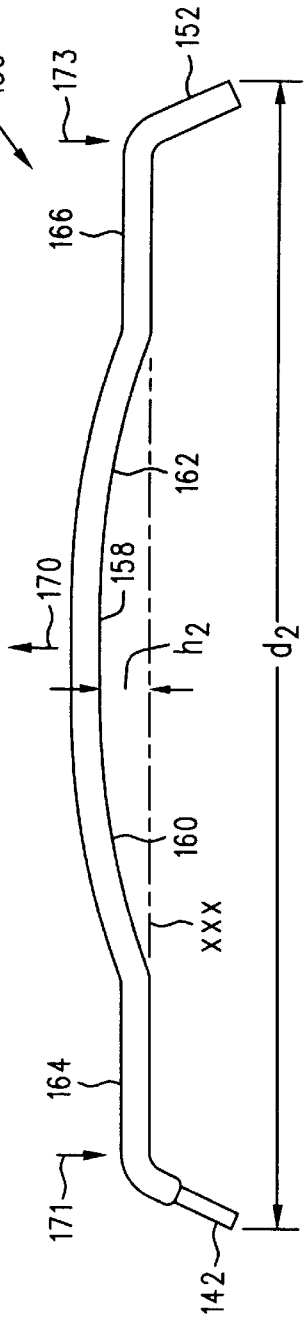
FIG. 6 is a schematic view of an elongated resilient member in a first stressed state.
Figure 7:
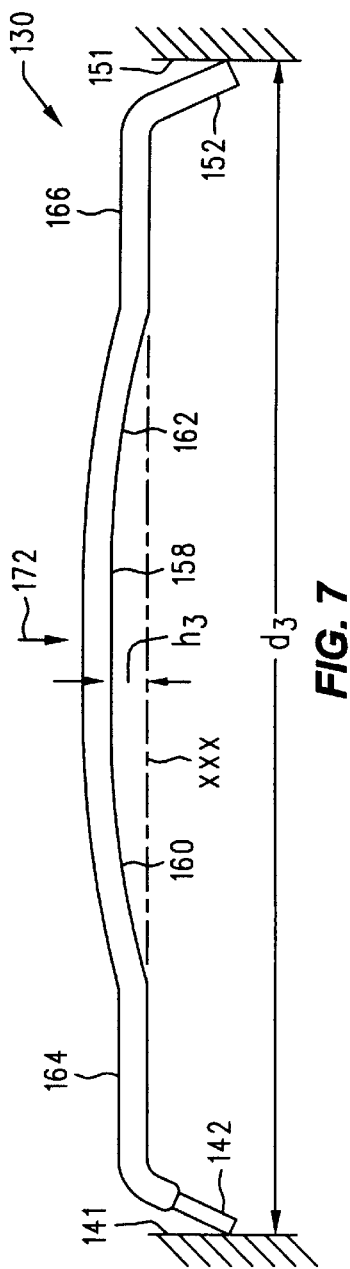
FIG. 7 is a schematic view of an elongated resilient member in a second stressed state.

FIGS. 5–7 illustrate the effect of application of different forces to the bowed portion 156 of the flexible member 130 when the member is supported at the lower surface of straight portion 164, 166, as by channel base wall 75 of rail member 40 or 42 which lies in a plane xxx. FIG. 5 shows the member 130 in an unstressed state wherein the distance between the lower surface of straight center portion 158 and plane xxx is $h_1$ and the distance between the end portions 142, 152 is $d_1$. FIG. 6 illustrates the member 130 in a stressed state in which a force 170 directed away from plane xxx is applied to the straight center portion 158 of the bowed portion. The end portions 142, 152 of the member 130 are prevented from moving in the direction of force 170 by a oppositely directed forces 171, 173 applied to portions 164, 166, as by channel sidewalls 71, 73 of member 40 or 42. As a result of application of these forces the bowed portion 156 is caused to be relatively more flexed than in FIG. 5 and the distance $h_2$ between center portion 158 and plane xxx is greater than the distance $h_1$. Also the distance $d_2$ between end portions 142, 152 is shorter than the distance $d_1$. FIG. 7 illustrates the effect of a force 172 directed opposite to force 170 applied to straight center portion 158 with the member 130 supported at the lower surfaces of straight portions 164, 166 by a fixed surface of xxx, such as channel base wall 75. The ends 142, 152 are urged outwardly as a result of force 172 but are restrained against displacement in directions 143, 153 by fixed surfaces 141, 151 spaced at a distance $d_3$ slightly less than $d_1$. The bowed portion 156 is flexed less than in either FIG. 5 or 6 and the bow shape is slightly flattened and thus height $h_3$ is less than $h_1$ or $h_2$. Ends 142, 152 are urged outwardly, in directions 143, 153, respectively, as a result of application of force 172 and thus apply an outwardly directed force to surfaces 141, 151.

Mounting Bracket 180

Figure 17:
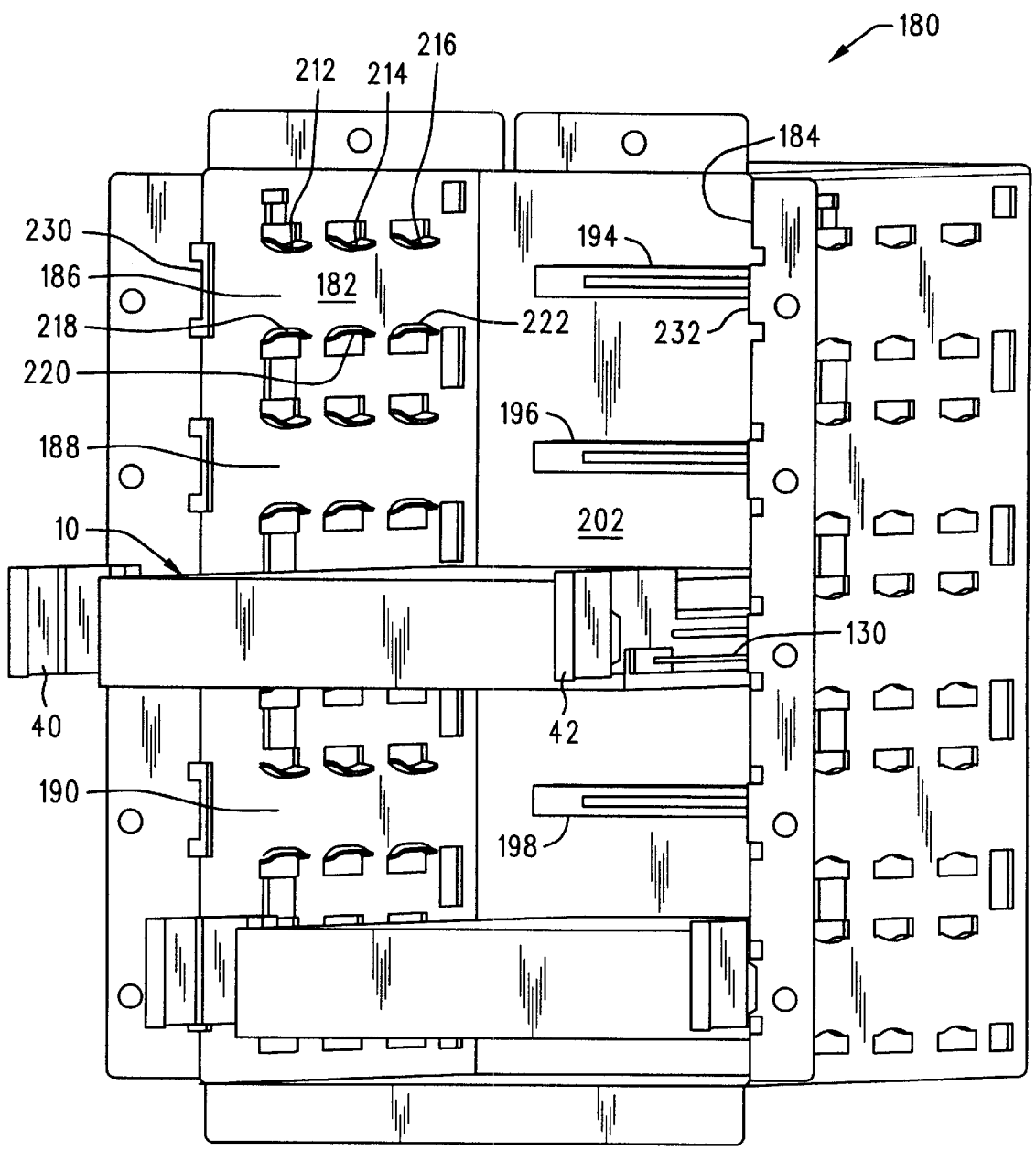
FIG. 17 is a perspective view of an electronic component mounting bracket with one electronic component partially inserted therein and one electronic component fully inserted therein.

A rack mount type mounting bracket 180 is illustrated in FIG. 17. The mounting bracket includes parallel side walls which in the illustrated embodiment are mirror image sheet metal side walls 182, 184. The side walls have oppositely positioned rail receiving portions 186, 188, 190, etc. therein, with the rail receiving portions in side wall 184 being mirror images of the rail receiving portions in side wall 182. The rail receiving portions are adapted to position an inserted electronic component into alignment with an associated electrical connector 194, 196, 198, etc. mounted on a back wall 202. Each of the rail receiving portions in the illustrated embodiment is defined by opposed sets of upper flanges 212, 214, 216 and lower flanges 218, 220, 222. It is to be understood, however, that there are many different structures which may be used for providing rail receiving portions in a bracket, including but not limited to slots formed in a wall studs, and opposed, parallel, stationary receiving rails. In the illustrated embodiment each of the rail receiving portions 186, 188 etc. has a transverse retaining flange 230, 232 etc., positioned at a front end portion thereof.

Mounting of Rail Members 40, 42 to Electronic Component 10

The manner in which rail members 40, 42 are mounted on an electronic component 10 with elongated flexible members 130 will now be described. Initially, elongated flexible members 130 are mounted on rail members 40, 42. Mounting may be accomplished by inserting one end portion e.g., 142 of flexible member 130 into cut out 102 and the other end portion 152 into rail cut out 88. After the end portions are inserted in the apertures the member 130 may be pushed toward the rail member 40 or 42 until straight portions 164, 166 come into contact with the base wall 75 of rail member channel 80. The reduced width regions 90, 98 of channel 80 may be constructed and arranged so that the sidewalls 71, 73 thereof receive the flexible member in snap-fit, resiliently holding relationship. The distance between cut outs 88 and 102 are such that the flexible member 130, when it is fully inserted into a rail member 40 or 42, is in the generally unstressed state illustrated in FIG. 5. The height of the rib portions 74, 76 and the bow height distance $h_1$ of the bowed portion 156 are such that the straight center portion 158 of the bowed portion projects slightly away from the outer surfaces of ribs 74, 76 thus enabling an operator to easily insert a tool, fingernail or the like between the surface of straight center portion 158 and the adjacent surfaces of the ribs. With the straight center portion 158 thus engaged with a tool, etc., the straight center portion is pulled away from the ribs, in the direction 170 shown in FIG. 6, with the straight portions 164, 166 being maintained in the channel by gripping contact with the reduced channel regions 90, 98 of channel 80 or through application of external force thereto in directions 171, 173. The elongated flexible member 130 is thus elastically deformed into a shape such as illustrated in FIG. 6 with end portions 142, 152 positioned at a distance $d_2$ which is slightly less than the distance between the outsides of apertures 24, 26 in the electronic component.

Figure 9:
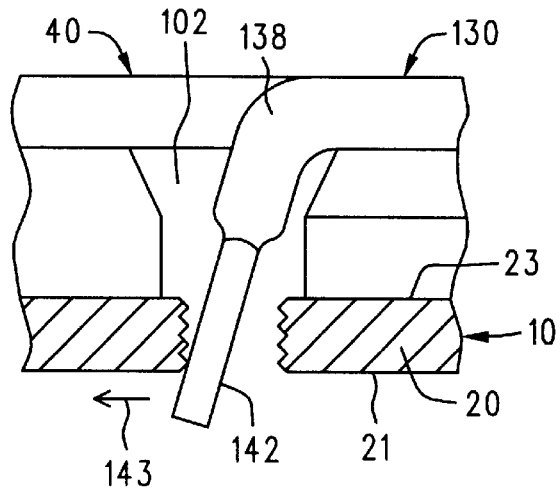
FIG. 9 is a detail cross sectional view of portions of a rail member, an elongated resilient member and an electronic component.

With the elongated flexible member 130 thus flexed the end portions 142, 152 are inserted into apertures 24, 26 and the entire rail member and flexible member assembly 40/130 is thereafter urged toward the electronic component 10 until side portion 54 of the rail member makes abutting contact with the sidewall surface 20 or 22 of the electronic component 10 and the terminal ends of end portions 142, 152 are positioned below the inside surface 21 of the component 10 side wall 20 or 22. Thereafter the force applied by tool or fingernail to the straight center portion 158 of the flexible member is released. As a result the end portions 142, 152 move outwardly slightly until engaging the outer peripherally of the apertures 24, 26 as shown in FIG. 9. The apertures 24, 26 may be positioned somewhat more closely e.g., 2 mm more closely, than the distance $d_1$ between flexible member end portions 142, 152 when the flexible member is in the unstressed state. As a result the flexible member 130 applies an outwardly directed force, i.e., in directions 143, 153 respectively against the outer wall of each aperture 24, 26 as illustrated in FIGS. 7, 9 and 10.

Because the end portions 142 and 152 are angled outwardly, and because the wall of apertures 24, 26 are substantially perpendicular to the surface of component 10, and because the wall of component 10 is relatively thin, the end portions 142, 144 may extend through the electronic component wall 20 and outwardly, as shown in FIG. 9 thereby resisting removal because of the wedge like interfering contact with the inside surface 21 of wall 20 at the bottom of the aperture. Also, the friction associated with surface contact between the threaded apertures and the end portions 142, 152 resists removal of the end portions 142, 152 from the bores 24, 26.

Figure 8:
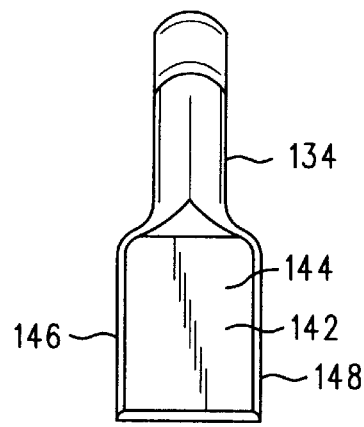
FIG. 8 is a detail end view of an elongated resilient member.
Figure 10:
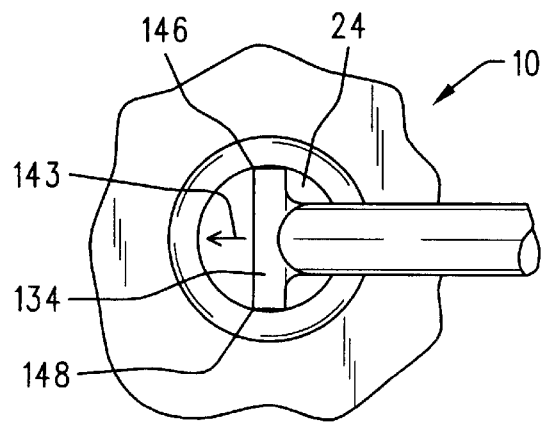
FIG. 10 is a detail view of portions of an elongated resilient member and an electronic component.
Figure 11:
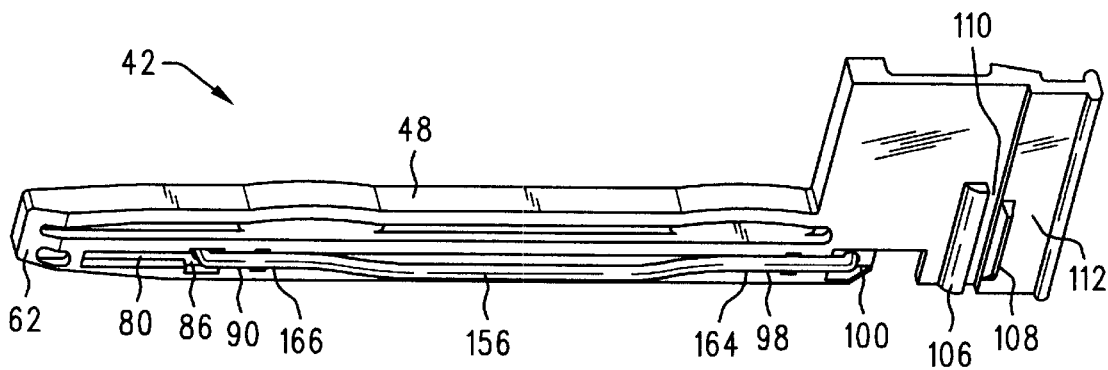
FIG. 11 is a frontal perspective view of a rail member having an elongated resilient member mounted thereon.

The use of an end portion, e.g. 142, with a flattened or rectangular surface 144 in association with a round bore aperture, e.g. 34, creates two bearing edges 146, 148, FIGS. 8 and 10 which add to the "bite" on the aperture wall which resists removal of the end portion from the aperture. (In another embodiment, not shown, a retaining nub is placed at the end of the flexible member end portions 142, 152 such that the nub projects slightly outwardly 143, beneath electronic component wall surface 21 when the flexible member is inserted so as to create a further resistance to removal). In order to remove the rail member from the electronic component 10 a reverse procedure is performed, i.e. the elongated flexible member is flexed so that the end portions 152, 154 move closer together and into a slightly more parallel relationship thus enabling the flexible member to be removed from apertures 24, 26.

FIGS. 13–16 illustrate an electronic component 10 having rail members 42, 44 mounted thereon through the use of elongated flexible members 130. The flexible members 40, 42 are positioned in parallel alignment with the left and right side walls 20, 22 of the component 10. As a result of outwardly directed 143, 153 forces applied to the outer walls of the apertures by the ends 142, 152 of the flexible member the rail members are held securely to component 10 and the entire component and rail member assembly may be picked up by grasping tab portions 112 of the rail members 40, 42.

Mounting of Component 10 in Mounting Bracket 180

The manner in which the component 10 with attached rails 40, 42 is mounted in mounting bracket 180 will now be described. The distance between the side walls of 182, 184 of the mounting bracket 180 is slightly greater than the distance between the outer surfaces of rails 40, 42 when the rails are mounted on component 10. The distance between the parallel side walls 182, 184 is slightly less than the distance between the outer surfaces of the straight center portion 158 of the elongated flexible members 130 associated with each rail 40, 42, such that when the component rail assembly is mounted between the bracket parallel side rails 182, 184 the elongated flexible members 130 are slightly inwardly, elastically deformed, as shown in FIG. 7, by the corresponding side walls 182, 184.

To begin the insertion process the beveled rear tip portion 62 of each rail 40, 42 is initially pushed in to a selected one of the rail receiving portions, e.g. 186, 188. The component and rail member assembly is then pushed into the bracket member with the rail receiving portions 186, 188 acting to align the rail member and component assembly with an associated electrical connector 194 such that a corresponding electrical connector 11 on the back wall 18 of the component is electrically connected when the component/rail assembly is fully inserted into the mounting bracket 180. Near the end of the insertion operation the rear rib 106 on each bracket member passes over an associated retaining flange 230, 232 on the bracket member causing the larger height portion 60 of the bracket member to first flex outwardly and then snap back such that the retaining flange 230, 232 is positioned in the retention slot 110 located between ribs 106, 108 on the rail member. The retention slot 110 thus acts to hold the electronic component and rail assembly in the mounting bracket 180 preventing it from being pulled out of the bracket until the front tab 112 is grasped and flexed laterally inwardly to release the associated retaining flange 230 or 232 from slot 110.

Figure 18:
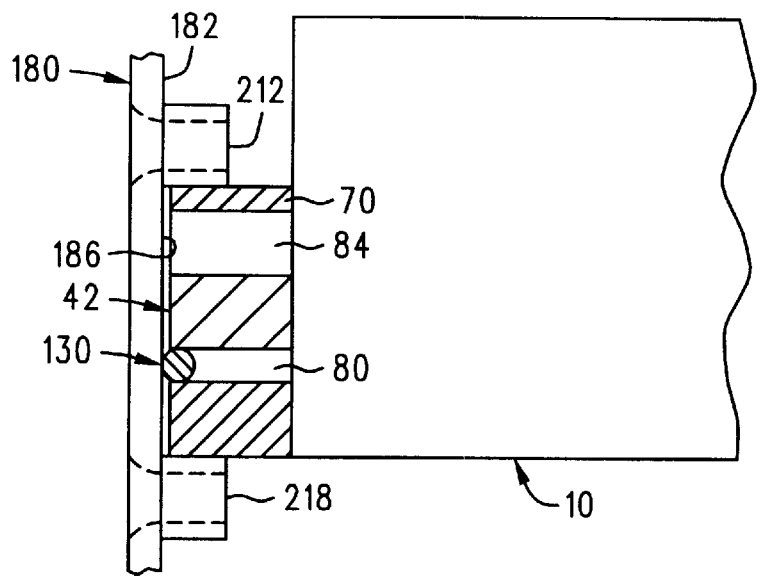
FIG. 18 is a detail, cross sectional, view of an electronic component mounted in a mounting bracket.

FIG. 18 illustrates the relative positions of various portions of the rail member 42, flexible member 130 and mounting bracket side wall 182 when the component and rail member assembly is mounted in the mounting bracket 180. The arched regions 66, 70 of each rail member 40, 42 are constructed and arranged such that they are positioned below corresponding ones of upper flanges 212, 216 of the bracket when the assembly 10/40/42 is fully inserted into the bracket. The spacing between opposite upper and lower flanges, e.g, 212, 218 is such that an upper and lower associated arched regions 66 is slightly compressed thereby and yet the flanges 212, 218 are positioned sufficiently far apart such that the flat top regions 64, 68 are not compressed thereby as they slide between the flanges 212, 218 during insertion. As a result it is relatively easy to slide the component/rail assembly into the bracket 180 and yet once it is in place it is firmly held in place resisting any upward and downward movement between the rail members 40, 42 and the bracket 180.

Figure 19:
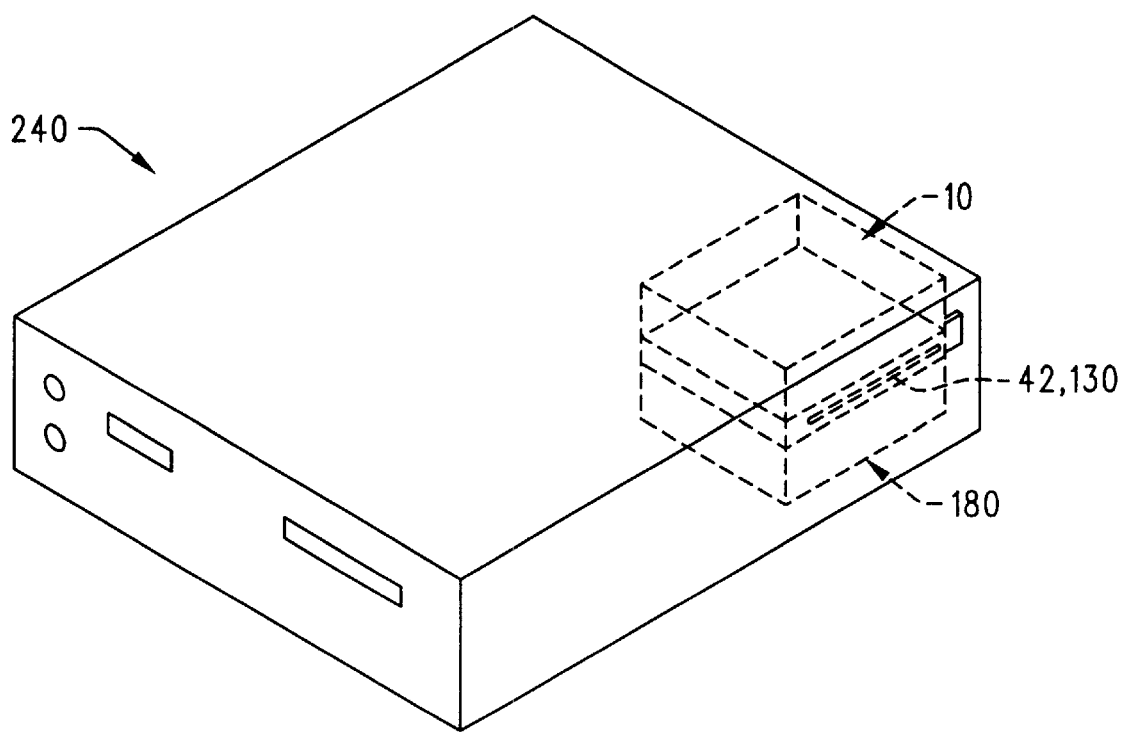
FIG. 19 is a schematic perspective view of an electronic apparatus having an electronic component mounted in a bracket unit thereof.

As also shown by FIG. 18 the elongate flexible member 130 straight center portion 158 has been urged slightly inwardly into channel 80 by side wall 186 which corresponds to the operating state shown by FIG. 7. Thus flexible member 130 makes pressurized contact with the sheet metal wall surface of the bracket 180 as well as making pressurized contact with the wall of electronic component 10. This pressurized contact provides a good electrical connection between the elongated flexible member and the bracket 180 and also the flexible member and the electronic component 10. In fact the compressive forces on the elongated flexible member 130 associated with mounting in bracket 180 acts to increase the pressure of the contact with electronic component above the pressure that existed before mounting of the component/rail assembly in bracket 180. Thus the component 10 is placed in electrically conductive relationship with the electrically conductive mounting bracket 180 enabling the component 10 to be grounded to an associated chassis, etc. of the electronic apparatus 240 to which the mounting bracket is groundedly attached, FIG. 19. Also, this compression of the elongated flexible member 130 on each side of the electronic component 10 holds the component 10 in a stable lateral relationship with the bracket 180. The compressive force exerted on the elongated flexible member also adds to the outward forces that it applies on the component 10, placing the portion of component 10 positioned between apertures 24, 26 under increased tension. This increase in outwardly directed force also increases the wedging force and frictional force between component 10 aperture and inside walls and member 130, thus ensuring that the rail members 40, 42 will remain securely attached to component 10 when it is mounted in bracket 180.

Another Embodiment

Figure 20:
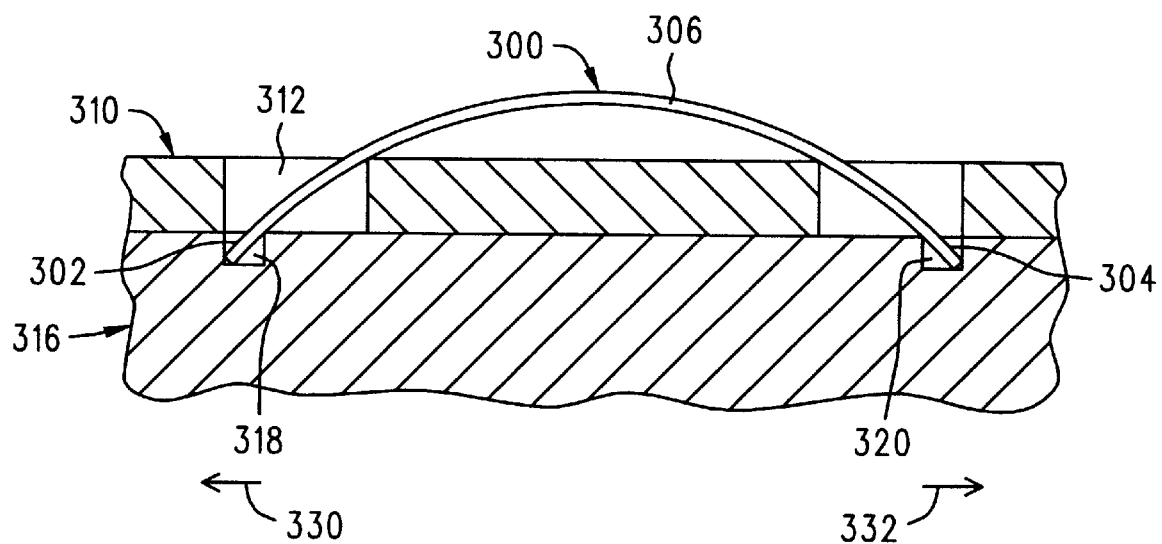
FIG. 20 is a schematic cross sectional view of an electronic component having a rail member mounted thereon by an elongated resilient member.
Figure 21:
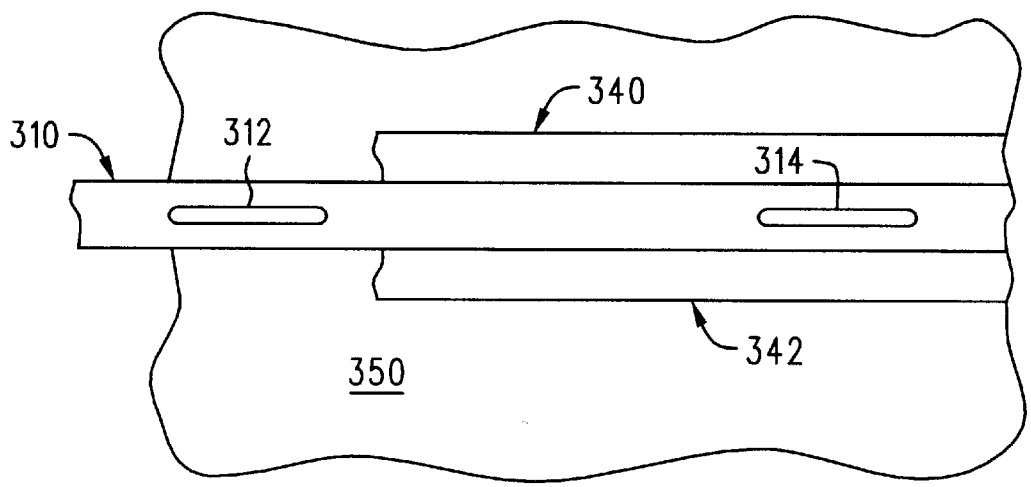
FIG. 21 is a schematic elevation view of the rail member of FIG. 20 received in a mounting bracket.

FIGS. 20 and 21 illustrate another embodiment of an elongated flexible member 300 having end portions 302, 304 and a bowed portion 306 which attaches a generally box shaped rail member 310 having elongated slots 312, 314 therein to an electronic component 316 having holes 318, 320. The end portions of the elongated flexible member 300 apply outward force 330, 332 on the side walls of holes 318, 320. In this embodiment the elongated flexible member 30 may be a straight component which is elastically deformed into the bowed shape illustrated in FIG. 20. In this embodiment the component rails 310 are received within a mounting bracket having opposite parallel receiving rails 340, 342 affixed to the bracket side wall 350.

Many alternative constructions of a conductive, elongated flexible member will be obvious to those skilled in the art who have read the above description. For example a member with multiple bowed portions, which when elastically flattened provide outwardly directed forces on engaged holes of an electronic component could be used instead of member 130, or 300.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. An electronic apparatus comprising:

an electronic component;

a rail member positioned adjacent said electronic component;

an elongated resilient member extending through said rail member and having an intermediate portion and having first and second end portions engaging said electronic component and applying opposite, outwardly directed forces thereto.

2. The electronic apparatus of claim 1, further comprising:

a component mounting bracket having a rail receiving portion, wherein said first rail member is received in said rail receiving portion; and wherein said elongated resilient member has said intermediate portion positioned in abutting contact with said component mounting bracket.

3. The electronic apparatus of claim 2 wherein said elongated resilient member is an electrically conductive member in electrical contact with electrically conductive portions of said electronic component and said component mounting bracket.

4. The electronic apparatus of claim 1:

said electronic component having first and second apertures; and said elongated resilient member first and second end portions being received in said first and second apertures.

5. The electronic device of claim 1 wherein said first and second end portions of said elongated resilient member project outwardly relative to said intermediate portion.

6. The electronic apparatus of claim 1 and further comprising:

a component mounting bracket having a rail receiving portion, wherein said first rail member is received in said rail receiving portion; and wherein said elongated resilient member is an electrically conductive member and said elongated resilient member has an intermediate bowed portion positioned in electrically conductive, compressive contact with said component mounting bracket.

7. The electronic apparatus of claim 6:

said electronic component having first and second apertures; and said elongated resilient member first and second end portions being received in said first and second apertures in electrically conductive contact with walls defining said apertures.

8. The electronic apparatus of claim 6, said rail member comprising at least one aperture, at least one of said elongated resilient member first and second end portions extending through said at least one aperture.

9. The electronic apparatus of claim 8, said at least one aperture comprising a first aperture and a second aperture adapted to receive, respectively, said first end portion and said second end portion of said elongated resilient member.

10. The electronic apparatus of claim 9, said rail member further comprising a channel portion, said intermediate bowed portion of said elongated resilient member being resiliently deflectable into said channel portion.

11. The electronic apparatus of claim 10 said elongated resilient member comprising at least one straight portion positioned between said intermediate bowed portion and one of said end portions and said channel portion comprising at least one reduced cross section portion adapted to resiliently receive and hold said straight portion of said elongated resilient member.

12. The electronic apparatus of claim 11, said component mounting bracket rail receiving portion comprising opposed sheet metal flanges, said rail member comprising at least one arcuate portion adapted to be resiliently deformed by sliding said rail member between said opposed sheet metal flanges.

13. The electronic device of claim 12 wherein said first and second end portions of said elongated resilient member project outwardly relative to said intermediate portion.

14. The electronic device of claim 1 wherein said first and second end portions of said elongated resilient member project outwardly relative to said intermediate portion.

15. The electronic device of claim 14, at least one of said end portions of said elongated resilient member comprising a flat portion.

16. A device for attaching a rack mount slide rail to an electronic component having a pair of spaced apart apertures on one side thereof comprising:

a unitary wire member having a first end portion and a second end portion sized to be received in said spaced apart apertures; said wire member having an unstressed operating state wherein said first and second end portions are spaced apart at a distance greater than the distance between said apertures and having an elastically strained operating state wherein said first and second end portions are spaced apart at substantially the same distance as the distance between said apertures.

17. The device of claim 16 said wire member having an intermediate bowed portion, said first and second end portions being positionable relatively closer together by increasing the curvature of said bowed portion.

18. The device of claim 17, said unitary wire member comprising a generally U-shaped member having a central body portion and first and second arm portions projecting from opposite ends of said central body portion, said central body portion comprising said intermediate bowed portion, said first and second arm portions comprising said first and second end portions of said wire member.

19. The device of claim 18, said arm portions extending outwardly relative to said central body portion.

20. The electronic device of claim 19, at least one of said end portions of said elongated resilient member comprising a flat portion.

21. A guide rail assembly for use in mounting an electronic component to an electronic apparatus comprising:

an elongated resilient guide rail member having first and second apertures therein;

a generally U-shaped wire member having an elongated central body portion and outwardly flared arm portions, said arm portions located in generally coplanar relationship with said body portion, said arm portions being received in said first and second apertures;

said wire member central body portion comprising at least one bowed portion;

said arm portions having terminal end portions; said wire member having an unstressed operating state with said terminal end portions spaced apart at a first distance and having a second operating state with said terminal end portions spaced apart at a second distance shorter than said first distance; said wire member being placed in said second operating state by elastically deformingly increasing the curvature of said bowed portion.

22. The guide rail assembly of claim 21, said guide rail comprising a channel portion, said bowed portion being deflectable into said channel portion through application of bow flattening pressure therto.

23. The guide rail assembly of claim 22, said channel portion comprising a reduced cross section portion sized to retainingly receive a portion of said central body portion of said member.

24. A method of mounting a rack mount slide rail to an electronic component comprising:

attaching an elongated resilient member to the slide rail;

elastically inwardly displacing; opposite end portions of said resilient member;

inserting the elastically inwardly displaced end portions of resilient member into apertures in the electronic component.

25. The method of claim 24 wherein elastically inwardly displacing the opposite end portions comprised flexing at least one bowed portion of the resilient member.

26. A method of mounting an electronic component in an electrical system comprising:

attaching an elongated resilient member to a slide rail;

applying a deforming force to elastically inwardly displace opposite end portions of said resilient member;

inserting the inwardly displaced end portions of resilient member into apertures in the electronic component;

releasing the deforming force so that the end portions deflect outwardly and engage the side walls of the apertures applying outwardly directed force thereto.

27. The claim of claim 26 further comprising:

sliding the slide rail into a rack portion of the electrical system while compressing the elongated resilient member between the rack portion and the electronic component to apply additional outwardly directed force to the side walls of the apertures.

28. An electronic apparatus comprising:

means for receiving at least one electronic components therein;

means for slingly supporting an electronic component received in said means for receiving;

means for tensioningly engaging said electronic component for attaching said component to said means for slidingly supporting said component.

29. The electronic apparatus of claim 28 wherein said means for tensioningly engaging comprises means for grounding said electronic component to said means for receiving.

* * * * *